March 17, 1953 C. PIERCE 2,631,421
DUPLEX WINDROW HARVESTER
Filed Aug. 15, 1949 3 Sheets-Sheet 1

Inventor
Clarence Pierce
by Alfred G. Hague
Atty

March 17, 1953  C. PIERCE  2,631,421
DUPLEX WINDROW HARVESTER
Filed Aug. 15, 1949  3 Sheets-Sheet 2
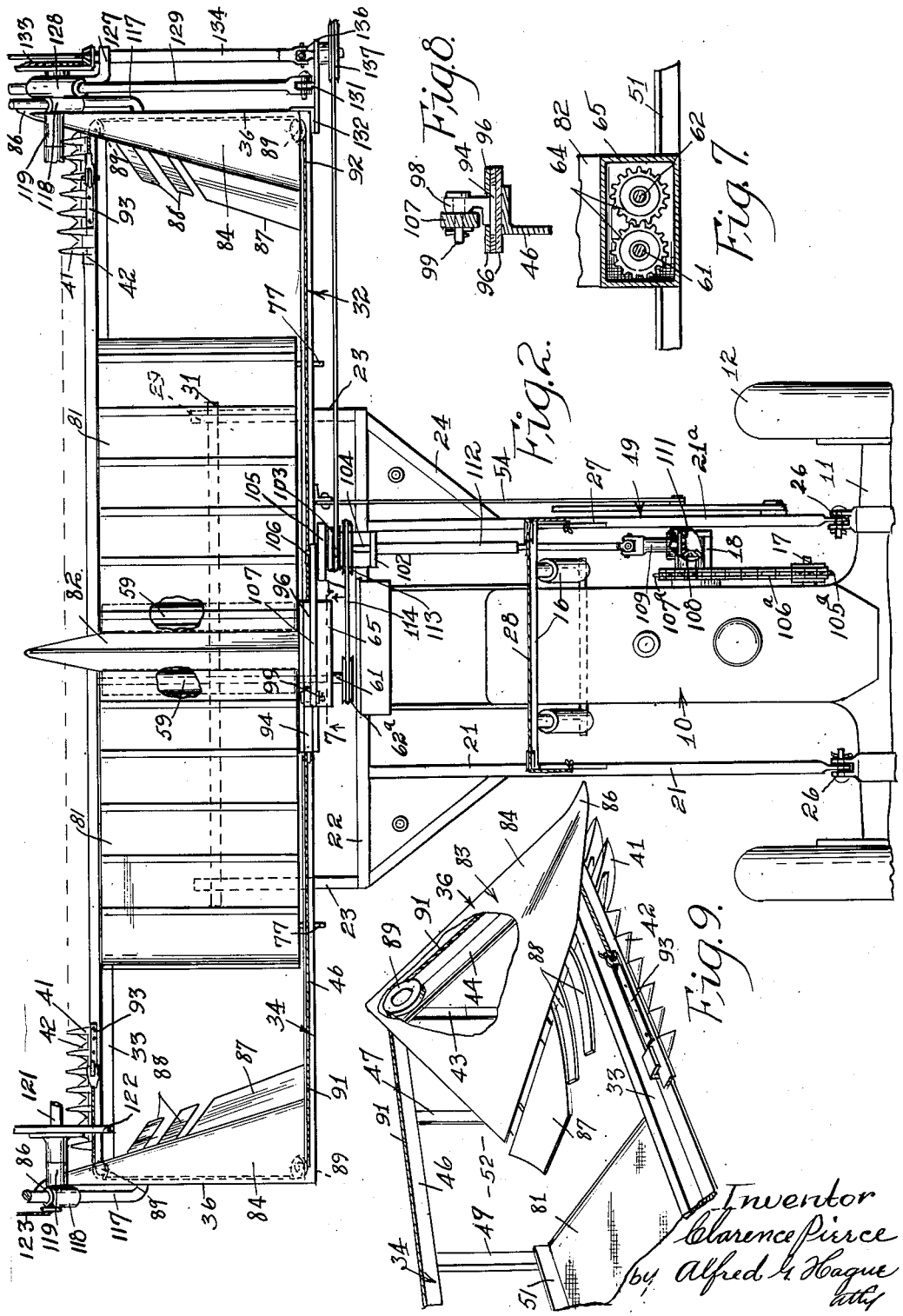

March 17, 1953 C. PIERCE 2,631,421
DUPLEX WINDROW HARVESTER
Filed Aug. 15, 1949 3 Sheets-Sheet 3
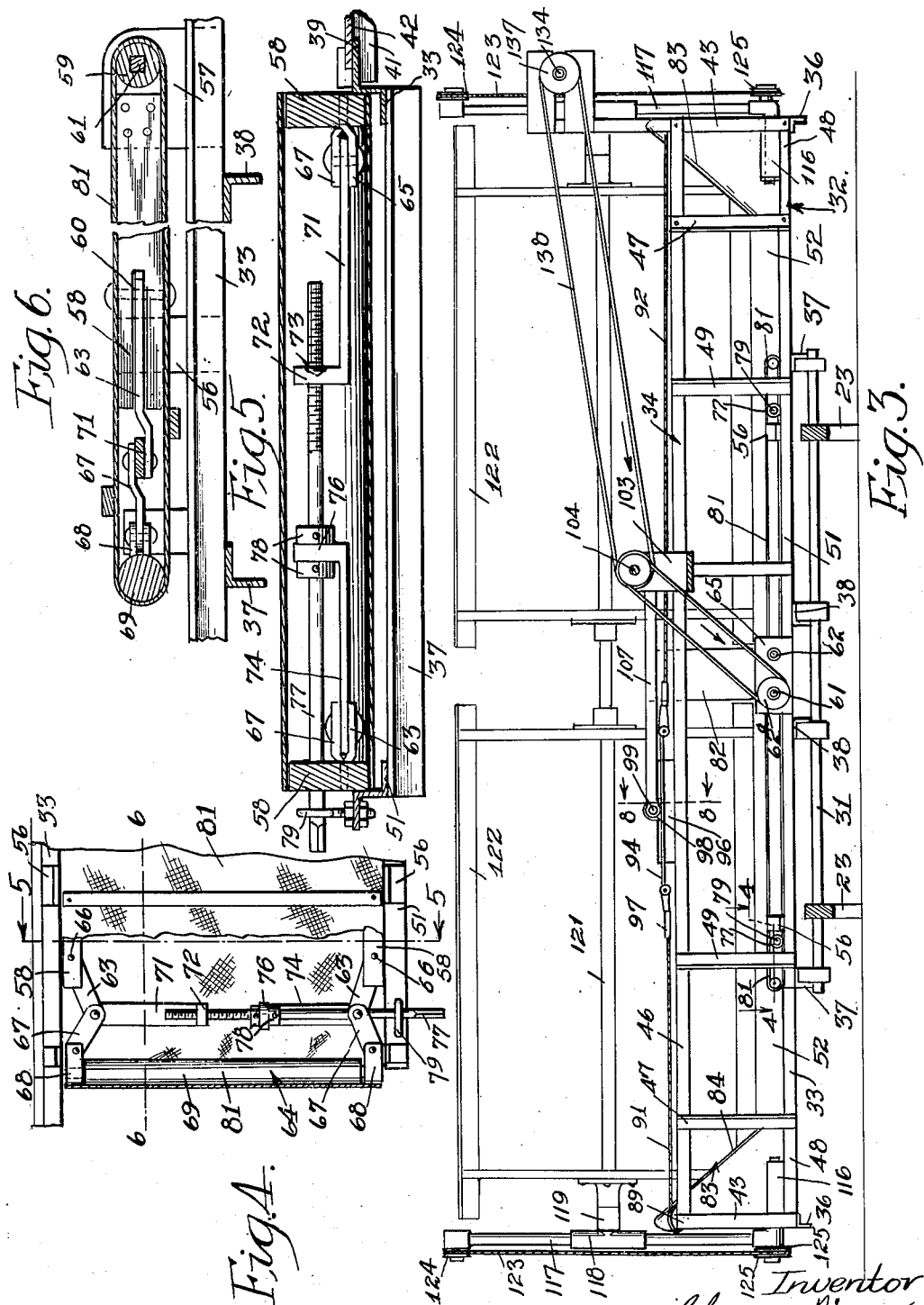

Patented Mar. 17, 1953

2,631,421

UNITED STATES PATENT OFFICE 2,631,421

DUPLEX WINDROW HARVESTER

Clarence Pierce, Bagley, Iowa

Application August 15, 1949, Serial No. 110,260

5 Claims. (Cl. 56—23)

My invention relates to that type of harvesters adapted to windrow small grain crops and more particularly to that type adapted to be mounted to the forward end of a farm tractor and forward of its front end.

I am well aware that for a number of years small grain has been harvested by first cutting it and placing it in windrows to dry before threshing, the threshing being accomplished by means of a portable thresher commonly known as a combined-harvester and thresher to gather the grain from the field and deliver it to the thresher. There is now in common use a small combined harvester and thresher adapted to harvest and thresh the grain in a single operation when the weather and field conditions will permit, which is also adapted to gather and thresh grain from the windrow by using a pick-up attachment provided for that purpose, these harvesters are quite small in order to be operated by the ordinary farm tractor, and adapted to cut a swath about seven feet wide which supplies the thresher with all of the grain that it can handle in crops of average stand. Inasmuch as the windrow harvester is comparatively light and requires less power to operate it than the combined-harvester, a larger swath can be harvested, say fourteen feet wide, in the same length of time and with the same amount of labor and power as required to operate the small sized harvester.

It is therefore the object of my invention to provide a windrow harvester so constructed and arranged that two windrows of grain may be formed simultaneously and deposited on the stubble in spaced windrows in such a manner that the tractor will operate between the windrows without treading down the grain.

A further object of my invention is to provide a windrow harvester in the form of a unitary unit that may be easily and quickly attached to a tractor to operative position forwardly of its front end, to be elevated and lowered by the hydraulic lift of the tractor and operated by power derived from the tractor.

A further object of my invention is to provide in a windrow harvester having a reciprocating cutter, improved means for actuating said cutter.

Another object of my invention is to provide in a harvester employing a continuous apron, improved means for adjusting and controlling the tension of the apron.

My invention consists in the construction, arrangement and combination of the various parts of the device whereby the objects contemplated are attained as hereinafter more fully set forth, pointed out in my claims and illustrated in the accompanying drawings, in which:

Figure 2 is a top view of Figure 1 with parts broken away and drawn to a smaller scale.

Figure 3 is a sectional view taken on the line 3—3 of Figure 1.

Figure 4 is a detail sectional view taken on the line 4—4 of Figure 3.

Figure 5 is an enlarged detail sectional view taken on the line 5—5 of Figure 4.

Figure 6 is an enlarged sectional view of the conveyor with parts broken away taken on the line 6—6 of Figure 4.

Figure 7 is a slightly enlarged sectional view taken on the line 7—7 of Figure 2.

Figure 8 is an enlarged sectional view taken on the line 8—8 of Figure 3.

Figure 9 is an enlarged perspective view of the left-hand end of the harvester platform.

For brevity, in the specification and drawings, duplicated parts and right and left hand sections bear the same reference numerals.

Figure 1:
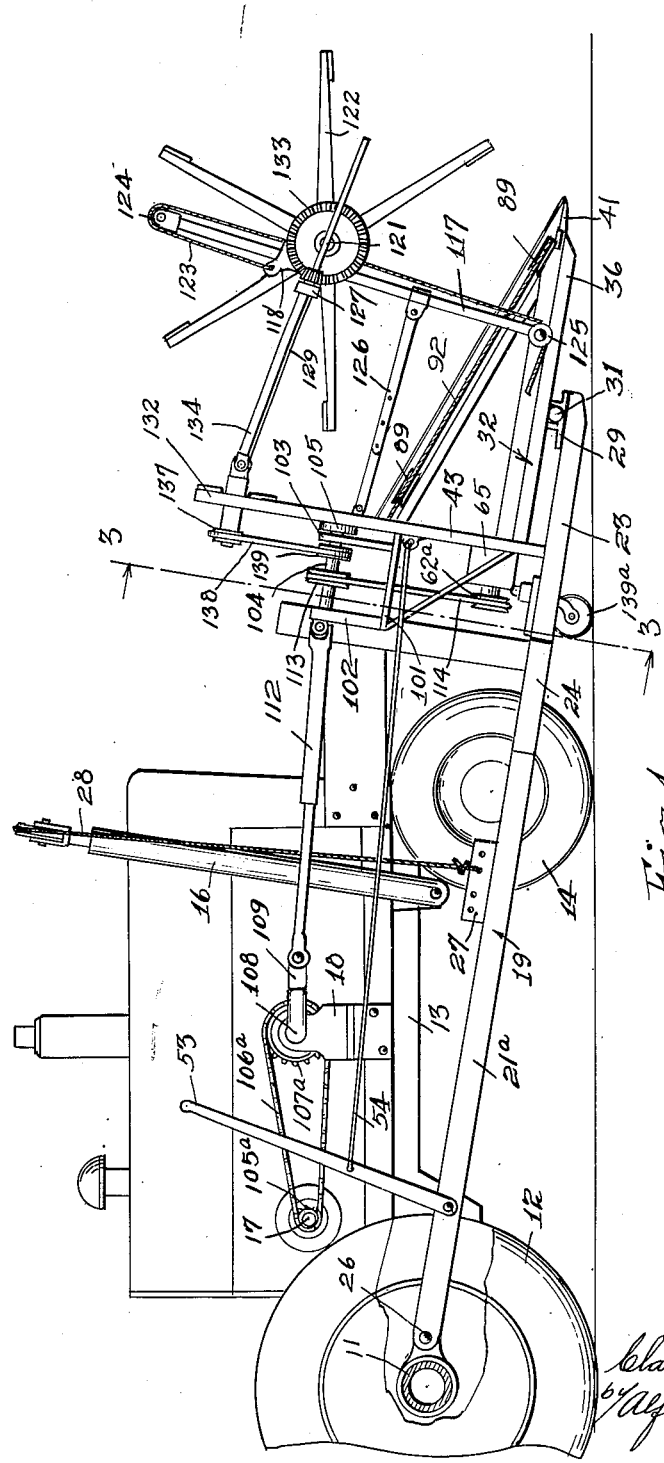
Figure 1 is a side elevation of a farm tractor, showing in end elevation my improved windrow harvester, a portion of one back wheel being broken away.

Referring to the drawings, the numeral 10 indicates a farm tractor of ordinary construction having a rear axle housing 11 supported by wheels 12, the forward end of the frame 13 is supported by wheels 14 and provided with a hydraulic lift 16 also of ordinary construction. The tractor is also provided with a power take-off shaft 17 and a gear bracket 18.

My improved harvester comprises a supporting frame 19 including parallel frame members 21 and 21ª, a cross member 22 having a similar forwardly extending portion 23 at each end and brace members 24. The rear ends of the members 21 and 21ª being pivotally connected to the axle housing 11 by detachable pivot devices 26, with the tractor body between them as illustrated in Figure 2. The cross member 22 being mounted ahead of the tractor a slight distance as illustrated. The frame members 21 and 21ª having near its central portion an upright plate 27, each being attached to a corresponding end of a cable 28 carried by the hydraulic lift 16, thus providing means for elevating the forward end of the frame 19.

Supported on the forward end of each frame member 23 I have provided a bearing 29 adapted to detachably support a transverse shaft 31 for mounting the harvester platform 32, comprising a bar 33 and a spaced upright frame 34 connected by end members 36 and intermediate members 37 and 38. The members 37 being mounted on the ends of the shaft 31 as illustrated in Figure 3. The bar 33 is provided with a forwardly extending flange 39 to which the guards 41 are mounted for supporting the sickle 42. Each end member 36 is of similar triangular formation including an upright back member 43 and an inclined top 44. The frame member 34 includes a horizontal bar 46 having each end connected to the upper end of a corresponding upright 43, the bar 46 is also provided with upright members 47 placed about 12 or 14 inches from the members 43, a bar 48 connects the lower ends of said uprights 43 and 47. A second set of uprights 49 are placed about 22 or 24 inches from the uprights 47, the lower ends of which are connected by a horizontal bar 51. A space 52 is thus provided between the lower ends of the members 47 through which the harvested grain will pass through in a manner hereinafter made clear. The bar 51 supports the rear ends of the bars 38.

Thus it will be seen that I have provided a platform pivotally mounted on the forward ends of the members 23 to permit the sickle bar to be elevated and lowered by rocking the platform on said shaft 31, this is accomplished by means of a lever 53 having its lower end pivoted to the member 21ᵃ and provided with a connecting rod 54 having its forward end pivoted to the frame member 46, any suitable means, not shown, may be provided for locking the lever in its various adjusted positions.

Mounted on each frame member 33 and 51 on each side of its center is a pair of brackets 56 and 57 supporting an apron guide 58. Rotatably mounted in the inner ends of each corresponding guides 58, and their supporting brackets 57, I have provided an apron drive roller 59 by means of shafts 61 and 62. The rear ends of said shafts extending through a gear box 65, and operatively connected together to rotate in opposite directions by gears 64 (see Fig. 7), the outer end of the shaft 61 being driven by a belt pulley 62ᵃ.

The outer end of each guide 58 is provided with a slot 60 to receive the pivot ends of links 63 of an apron tightener 64, one end of each link being pivoted therein by a pivot pin 66. Pivoted to the outer end of each link 63 is a link 67, the outer end of each link 67 being pivoted to a bearing member 68 supporting corresponding ends of an apron roller 69. Pivoted to the adjoining ends of the front links 63 and 67 is a bar 71 having its rear end formed with an upwardly extending portion 72 having a screw threaded opening 73. A similar bar 74 has one end pivoted to the rear links 63 and 67 and its other end formed with an upwardly extending lug 76 for rotatably mounting a shaft 77 between collars 78, the forward end of said shaft being threaded into the lug 72 with its rear end rotatably mounted in an eye bolt 79.

Mounted on each of the rollers 69 and its corresponding roller 59 is an apron 81. From the above construction it will be seen that the apron 81 may be easily tightened by simply rotating the shaft 77 to cause the pivoted ends of the links 63 and 67 to be separated; in this connection it will be seen that either end of the roller 69 will within certain limits adjust itself, one end relative to the other to accommodate any slight variation in apron lengths, between its front and back edges. Thus it will be seen that I have provided two aprons for receiving the grain from the sickle bar to be delivered in opposite directions from the center of the platform.

A box-like member 82 is mounted above the rollers 59 to help separate the two streams of severed grain the forward end of said member 82 being pointed and extending forwardly of the sickle bar 42. The outer end of each of the aprons 81 terminating near the inner end of the space 52 as illustrated in Figure 3.

Formed at each end of the platform frame I have provided what I shall term a grain board 83, comprising an inclined plate 84 of substantially triangular formation having the lower edge of its back end terminating near the lower end of the member 47 and its upper edge near the upper end of the member 43, with its upper and lower edges terminating near the end of the frame member 33, with its forward end forming a hooked portion 86. The back end of the lower edge of the plate 84 is provided with a downwardly and inwardly extending deflector plate 87 having its front edge inclined rearwardly. The front end of the lower edge of the plate 84 having a pair of spaced bars 88 inclined rearwardly to assist in moving material from the plate 84 inwardly to the delivery space 52.

For operating the sickle 42 I have provided the following mechanism; pivotally mounted on each of the upper corners of the platform frame I have provided a pulley 89 for mounting cables 91 and 92, each having its lower ends connected to a bracket 93 secured near each end of the sickle 42 as shown in Fig. 2. The opposite ends of the cables are connected to a slide bar 94 mounted in guides 96 supported on top of the frame member 46 (see Fig. 8) each cable including a turn buckle 97. The slide bar 94 is provided with a pivot head 98 supporting a pivot pin 99. By the above arrangement it will be seen that if the bar 94 is reciprocated then the sickle 42 will also be reciprocated.

Fixed to the back of the frame member 46 I have provided a bracket 101 having upwardly extending bearings 102 and 103 rotatably supporting a shaft 104. Fixed to the forward end of the shaft 104 is a crank head 105 provided with a pin 106 supporting one end of a connecting rod 107 having its other end mounted on the pin 99. Supported on the bracket 18 is a gear casing 108 in which is mounted a shaft 109 driven by bevel gears 111. A telescopic shaft 112 connects the free ends of the shafts 109 and 104. The power take-off shaft 17 has a sprocket 105ᵃ supporting a chain 106ᵃ mounted on a sprocket 107ᵃ for operating the bevel gears 111. The shaft 104 is also provided with a belt pulley 113 on which is mounted a belt 114 which in turn is mounted on the pulley 62ᵃ thus providing means driven from the power take-off shaft of the tractor for operating the sickle and the aprons.

Mounted on each of the frame members 36 is a bearing 116 pivotally mounting the lower end of an upright reel support 117. Each support 117 has a movably mounted sleeve 118 supporting a shaft bearing 119. Rotatably mounted in said bearings is a reel shaft 121 mounting a pair of reels 122, the bearings 119 are elevated and lowered by cables 123 each having one end fixed to its respective sleeve 118 and passed over pulleys 124 carried by the upper ends of the supports 117. Thence downwardly under pulleys 125, thence rearwardly to any convenient point on the tractor, not shown. Links 126 provides means for adjusting the reel forwardly and rearwardly relative to the sickle bar 42. Means operated from the tractor might be substituted if so desired for the adjustable links.

Pivotally mounted on the right hand sleeve 118 I have provided a bracket 127 including a sleeve 128, said sleeve being slidably mounted on a shaft 129 having its rear end pivoted to a bracket 131 fixed to the upper end of an upright frame member 132 fixed to the upper end of the member 43. Fixed to the right hand end of the reel shaft 121 is a bevel gear 133. Rotatably mounted in the bracket 127 and the bracket 131 is a telescopic shaft 134 including a universal joint 136. The back end of shaft 134 is provided with a belt pulley 137 supporting a belt 138 driven by a pulley 139 mounted on the shaft 104, means is thus provided for rotating the reel from the power take-off 17. The pulley 137 might be of the adjustable type to vary the speed ratio between the shafts 104 and 134 if so desired.

By placing the crank 103 and the connecting rod and the slide bar 94 on top of the frame member 46 the said parts are located above the ground a considerable distance to increase its accessibility for oiling and care, and also against the collection of dirt and other undesirable substances. By pivoting the frame members 21 and 21ª to the tractor axle housing the hydraulic lift which is usually a part of the tractor equipment, may be used to elevate the harvester at such times as it is desired, to move the equipment over the highways, or from field to field. Castor wheels 139ª are provided to support the weight of the harvester when in operation. By placing the harvester ahead of the tractor it will be seen that the tractor operates only on harvested areas and that all of the windrows on said area are spaced from the standing unharvested grain so that at no time is the windrows treaded into the ground or engaged by the harvester on its return trip. It will be seen from the above construction that only a portion of the grain severed by the cutter will be delivered to the aprons, some direct to the ground and the remainder to the grain boards.

In operation assuming that the harvester has been attached as above described and that the tractor and harvester are being advanced into standing grain with the wheels 139 on the ground surface, the sickle 42 will sever the stalks the tops of which will be delivered rearwardly by the reel 122, part of which will be delivered to the aprons 81, part to the spaces 52 and part to the grain boards 84. As the harvester is advanced the aprons 81 will move the severed grain thereon outwardly in opposite directions to the spaces 52, while that portion of the grain falling on the grain boards will be moved inwardly to said openings by gravity, stubble extending upwardly through the spaces between the bars 88 will help to deliver the grain from said boards.

The apron tightner 64 provides means for quickly and easily adjusting the tension of the aprons by simply placing a suitable wrench on the back end of the shaft 77.

Thus it will be seen that I have invented an improved windrow harvester in the form of an attachable unit that may be easily and quickly attached to the ordinary farm tractor and when so attached will enable the farmer to rapidly harvest and windrow his grain by delivering two windrows simultaneously, one on each side of the tractor and so spaced apart that the tractor will pass between them without treading the grain into the ground. It will also be seen that I have provided an improved means for driving a long sickle bar to overcome its tendency to buckle on the push stroke, when the conventional crank and pitman construction is employed.

I claim:

1. A windrow harvester comprising an elongated platform mounted transversely of its line of advance having a delivery space near each end, a sickle adjacent the forward edge of said frame, means for causing grain being severed to fall on said frame, means at each end of said frame for moving grain inwardly to a corresponding delivery space, and means for moving the severed grain from the transverse center of said frame outwardly to said delivery spaces whereby two spaced windrows will be simultaneously layed on the stubble formed behind said sickle and spaced inwardly from the corresponding ends of the swath of stubble formed by said sickle.

2. A windrow harvester comprising an elongated and horizontal platform, means mounting said platform transversely of its line of advance, a grain board at each end of said platform having its lower edge inclined inwardly and rearwardly and provided at its rear end with a downwardly and inwardly inclined plate and at its forward edge with a plurality of spaced deflector bars inclined downwardly, inwardly and rearwardly, a pair of endless aprons mounted end to end on the central portion of said platform with their outer ends terminating some distance from said grain boards to provide delivery spaces therebetween, means for simultaneously moving said aprons in opposite directions, and means for cutting and delivering grain rearwardly to said aprons, grain board, and delivery spaces as the frame is advanced forwardly.

3. A windrow harvester comprising a supporting frame employing a transverse bar, a forwardly extending frame member at each end of said bar, a pair of spaced frame members extending rearwardly from said bar intermediate its ends to receive a tractor between them, means for attachably connecting the free ends of the last frame members to a tractor housing, means for attaching said frame members to a tractor lift at points intermediate their ends to elevate and lower the entire supporting frame by said tractor lift, a castor wheel for supporting each end of said bar when in its lowered position, a rock shaft carried by the forward end of the first frame members, a harvester platform mounted on said rock shaft, and means for tilting said platform to elevate and lower its forward end.

4. A windrow harvester comprising a supporting frame employing a transverse bar, a forwardly extending frame member at each end of said bar, a pair of spaced frame members extending rearwardly from said bar intermediate its ends to receive a tractor between them, means for attachably connecting the free ends of the last frame members to a tractor housing, means for attaching said frame members to a tractor lift at points intermediate their ends, a castor wheel for supporting each end of said bar, a rock shaft carried by the forward end of the first frame members, a harvester platform mounted on said rock shaft, means for tilting said platform to elevate and lower its forward end, said platform having a delivery space near each end, a sickle adjacent to the front edge of said platform, a reel for delivering the severed grain to said platform, means at each end of said platform for moving grain inwardly to its adjacent delivery opening, and means for moving grain from the central portion of the platform simultaneously and in opposite directions to said delivery openings, whereby two spaced windrows of grain will be layed simultaneously on the stubble behind the sickle and some distance from the standing grain.

5. A windrow harvester comprising a supporting frame employing a transverse bar, a forwardly extending frame member at each end of said bar, a pair of spaced frame members extending rearwardly from said bar intermediate its ends to receive a tractor between them, means for attachably connecting the free ends of the last frame members to a tractor housing, means for attaching said frame members to a tractor lift at points intermediate their ends, a castor wheel for supporting each end of said bar, a rock shaft carried by the forward end of the first frame members, a harvester platform mounted on said rock shaft, means for tilting said platform to elevate and lower its forward end said platform having a delivery space near each end, a sickle adjacent to the front edge of said platform, a reel for delivering the severed grain to said platform, means at each end of said platform for moving grain inwardly to its adjacent delivery opening, means for moving grain from the central portion of the platform simultaneously and in opposite directions to said delivery openings, and means operated from the power take-off of a tractor for imparting movement to the last said means.

CLARENCE PIERCE.

REFERENCES CITED

The following references are of record in the file of this patent:

UNITED STATES PATENTS

| Number | Name | Date |
|---|---|---|
| 921,110 | Holly | May 11, 1909 |
| 1,669,357 | Stout | May 8, 1928 |
| 1,724,300 | Moncreiffe | Aug. 13, 1929 |
| 1,740,723 | Blewett | Dec. 24, 1929 |
| 1,792,691 | Harris et al. | Feb. 17, 1931 |
| 1,844,860 | Lindgren | Feb. 9, 1932 |
| 1,859,168 | Raney | May 17, 1932 |
| 1,917,352 | Apsel | July 11, 1933 |
| 2,282,567 | Ellefson | May 12, 1942 |
| 2,529,612 | Kayser | Nov. 14, 1950 |
| 2,532,426 | Schroeppel | Dec. 5, 1950 |